United States Patent Office 2,982,789
Patented May 2, 1961

2,982,789

MANUFACTURE OF TRIFLUOROETHANOL

Lee B. Smith, Woodbridge, and Cyril Woolf, Morristown, N.J., assignors to Allied Chemical Corporation, a corporation of New York No Drawing. Filed Dec. 13, 1957, Ser. No. 702,521

3 Claims. (Cl. 260—633)

This invention is directed to processes for making trifluoroethanol, $CF_3CH_2OH$, a known compound, particularly adapted for use as a starting material for the production of trifluoroethyl vinyl ether, $$CF_3CH_2OCH=CH_2$$

an anethetic.

It has been proposed to make trifluoroethanol, a colorless liquid having a boiling point of 74.5° C., by a process involving high pressure, high temperature reaction of $CF_3CH_2Cl$ with potassium acetate, followed by saponification of the resulting acetate ester. This and other suggested prior procedures are relatively complicated and unsuitable for economical commercial use.

A major object of the present invention lies in the provision of processes for making trifluoroethanol from trifluoroacetaldehyde, $CF_3CHO$, by an easily controllable, catalytic gas-phase reaction which may be carried out at ordinary pressure and at relatively low temperature. A further objective of the invention is provision of processes for making $CF_3CHO$ in a form particularly adaptable for use as a starting material in connection with production of $CF_3CH_2OH$.

We have found that trifluoroethanol may be prepared advantageously, according to our process which is adapted for continuous operation, by reacting hydrogen with $CF_3CHO$ in the vapor phase at temperatures substantially in the range of 200–300° C. while in the presence of a catalyst comprising metallic copper and an oxide of chromium. The major reaction of the invention process may be represented by $$CF_3CHO + H_2 \rightarrow CF_3CH_2OH$$

General procedural steps of the major phase of the invention comprise passing hydrogen and vaporous $CF_3CHO$ through a suitable reactor while maintaining therein certain catalysis conditions, discharging the reaction products from the reactor, and handling the product gases more or less in accordance with conventional practice to obtain the desired trifluoroethanol product.

In carrying out the invention process, a vaporous mixture of hydrogen and trifluoroacetaldehyde, $CF_3CHO$, (B.P. minus 20° C.) is passed at a temperature substantially in the range of 200–300° C., preferably at temperature substantially in the range of 240–275° C., through a reactor charged with a catalyst comprising metallic copper and an oxide of chromium, for a period sufficient to bring about the hydrogenation reaction indicated. The reactor exit gases may be handled in any suitable way to recover trifluoroethanol and separate the same from unreacted hydrogen and $CF_3CHO$. For example, reactor exit gases may be cooled, as in a Dry-Ice cooled trap, to well below the minus 20 C. boiling point of $CF_3CHO$, in which case $CF_3CHO$ and the $CF_3CH_2OH$ are condensed and separated from unreacted hydrogen. The ethanol may then be recovered by distillation.

The metallic copper-chromium oxide catalyst employed in the major phase of our process may be prepared by coprecipitating the hydroxides of the copper and chromium by the addition of a solution of potassium hydroxide to a solution of their nitrates, filtering, washing and drying the filter cake. The dried cake may be granulated, pressed into pellets or used in other desirable physical form. Prior to use in the hydrogenation phase of this invention, the catalyst is placed in the reactor and reduced in a stream of hydrogen while slowly raising the temperature up to say 350° C. To prevent excessive temperature rise due to heat of reduction, the hydrogen may be diluted with nitrogen. Copper compound is reduced to metallic copper, and chromium takes the oxide form believed to be $Cr_2O_3$. If desired, the catalyst may be used on a suitable support, or conveniently the catalyst material and a support may be coprecipitated. Although calcium fluoride is preferred as the support, other supports such as other alkaline earth fluorides may be used. Spent catalyst can be reconverted to the starting materials required for catalyst preparation by digestion of the spent catalyst with nitric acid.

Weight ratio of metallic copper to oxide of chromium may vary considerably. Particularly outstanding results may be obtained using a catalyst comprising copper metal and an oxide of chromium supported on calcium fluoride, in which catalyst material the weight ratio of copper to oxide of chromium is about 2:1, and weight ratio of copper to $CaF_2$ support is about 1:2. Metallic copper to chromium oxide weight ratio may lie substantially in the range of 1:1 to 5:1, preferably about 2:1; and metallic copper to support weight ratio may lie substantially in the range of 1:10, preferably 1:2.

The hydrogen and trifluoroacetaldehyde reactant may be mixed in any desired proportions. Hydrogen should be present in amount at least sufficient to react with a substantial amount of the aldehyde to form a substantial amount of the trifluoroethanol. An excess of hydrogen or equimolecular proportions may be employed. In large scale work, it is advantageous and preferable to adjust ratios of reactants, reaction temperatures and residence time so that hydrogen is substantially completely reacted, and hence it is preferred to utilize less than equivalent proporions of hydrogen even if recycling of some aldehyde becomes necessary.

The temperatures at which the hydrogen-trifluoroacetaldehyde reaction may be carried out, at normal atmospheric or superatmospheric pressures, lie substantially in the range of 200–300° C., and preferably are in the range of about 240–275° C. At temperatures lower than about 200° C. little or no reaction is obtained, whereas at temperatures above about 300° C., there is marked fragmentation of organic material with the formation of undesired by-products such as $CHF_3$, $CO$, $HF$ and carbon.

Space velocity of the gaseous reactants (volumes of reactant gas at room temperature per volume of catalyst per hour) may lie in the range of 200–1000, and space velocities of about 500–700 have been found to be particularly desirable. Reaction rate at the temperatures specified is usually quite rapid, so that the contact time is not particularly critical and, depending upon particular operating conditions at hand, may be determined by test run.

Products exiting the reaction zone consist of the sought-for product $CF_3CH_2OH$, (B.P. 74.5° C.) together with any unreacted $CF_3CHO$ (B.P. minus 20° C.) and possibly some hydrogen. The organic portion of the reactor exit may be isolated by suitable cooling, such as in a Dry-Ice acetone trap. By this procedure, unreacted hydrogen passes through the trap while $CF_3CH_2OH$ and unreacted $CF_3CHO$ are obtained as condensate in the trap. The $CF_3CH_2OH$ product may be recovered from the condensate by fractional distillation.

Trifluoroacetaldehyde has a marked tendency to polymerize. While this material may be made and, as described below, be isolated in the monomeric state from other reaction products, the characteristics of $CF_3CHO$ are such that the compound is not too amendable to convenient handling by commonplace commercial techniques. $CF_3CHO$ may be produced by subjecting $CF_3COCl$ to the action of hydrogen at an elevated temperature and in the presence of a catalyst to form $CF_3CHO$ and $HCl$.

In accordance with another phase of the invention, it has been found that the total reaction product obtained by catalytic, elevated temperature reaction of $CF_3COCl$ and hydrogen is suitable for use and may be employed advantageously as a starting material in connection with production of $CF_3CH_2OH$. Hence, a preferred embodiment of practice of the invention involves production of $CF_3CHO$ in one stage in accordance with

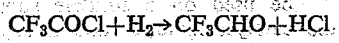

$$CF_3COCl + H_2 \rightarrow CF_3CHO + HCl$$

in conjunction with production of $CF_3CH_2OH$ in a second stage in accordance with

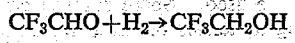

$$CF_3CHO + H_2 \rightarrow CF_3CH_2OH$$

We find that the presence of hydrogen in the first stage in the amount sufficient for the entire operation does not interfere with efficiency of the first stage with regard to dechlorination of $CF_3COCl$, and that the presence, in the second stage, of the HCl by-product of the first stage does not adversely affect the activity of the herein metallic copper-chromium oxide catalyst with respect to hydrogenation of $CF_3CHO$ for production of $CF_3CH_2OH$.

Trifluoroacetylchloride, a known compound, is a colorless liquid boiling at minus 18.5° C.

An important feature of the dechlorination stage of the preferred embodiment of the invention is the nature of the catalytic material employed and the composition thereof. This catalyst consists of palladium supported on activated carbon, and affords two marked advantages, namely, facilitates use of low reaction temperatures, and effects high yield of sought-for product. With regard to preparation of the catalyst, a water-soluble palladium salt which is capable of reduction to elemental palladium by hydrogen may be employed. Readily available palladium chloride is preferred. Any of the commercial activated carbons may be used, e.g. Columbia 6G Carbon, Columbia SW Carbon, or Darco Carbon. If desirable, the activated carbon may be treated preliminarily to remove any silica by leaching with aqueous HF, water washing, and drying. The granular, activated carbon support may be immersed in an aqueous solution of palladium chloride. The carbon carrying absorbed palladium chloride is separated from the water and preliminarily dried at about 120° C. The catalyst may then be heated at temperatures of say 150–300° C. in a stream of hydrogen to eliminate water and reduce the palladium salt to elemental palladium. The amounts of palladium employed may be such that the finished palladium on activated carbon catalyst contains substantially in the range of 0.5–10.0 weight percent of palladium based on the weight of carbon. The preferred range of palladium concentration, to obtain optimum results, lies substantially in the range of about 2–5 weight percent of Pd.

Practice of the dechlorination stage procedurally comprises passing a gas-phase mixture of $CF_3COCl$ and hydrogen through a reaction zone containing the palladium-activated carbon catalyst and maintained at relatively low activated temperatures. Apparatus may comprise preferably a tubular reactor, made of nickel or other suitable material such as Inconel, Monel and stainless steel, mounted in a furnace provided with means for maintaining the reaction zone in the reactor at the desired elevated internal temperature. The reactor may include inlets for introduction of controlled amounts of hydrogen and vaporous $CF_3COCl$, and may be provided with a reaction product exit connected directly to the inlet of the reactor employed in the hydrogenation stage.

Significant reaction and formation of $CF_3CHO$ are effected at temperatures as low as about 130° C. Properties of the palladium-activated carbon catalysts described are such that reaction temperatures need not exceed about 250° C. Preferred temperatures lie in the range of about 180–210° C. It is noted that when using this catalyst along with an adequate sufficiency of hydrogen, elevating temperature to induce hydrogenation to trifluoroethanol resulted only in fragmentation of organic material with formation of decomposition products including HF, C, CO and trifluoromethane. Further, attempts to convert $CF_3COCl$ and hydrogen directly to $CF_3CH_2OH$, using the herein metallic copper-oxide of chromium catalyst at temperatures above and below 300° C., resulted in fragmentation and passage of most of the $CF_3COCl$ unreacted through the catalyst bed.

With regard to the dechlorination stage, hydrogen may be employed in any quantity sufficient to react with a significant amount of the $CF_3COCl$ starting material. Stoichiometric amounts of reactants are in a 1:1 molar ratio. Ordinarily, it is undesirable to use hydrogen in quantity appreciably more than 1.5 mols of hydrogen per mol of $CF_3COCl$, preferred quantities of hydrogen lying substantially in the range of 0.75–1.5 mols per mol of $CClF_2 \cdot COCl$. We find that reaction or contact time in the dechlorination stage may be substantially the same as in the above described hydrogenation stage, thus affording the advantage that it is unnecessary to provide for different space velocities in different reaction zones. The dechlorination reaction product, comprising $CF_3CHO$, HCl, any unreacted $CF_3COCl$, and preferably the hydrogen needed for hydrogenation of $CF_3CHO$, are fed directly at the temperature thereof in the hydrogenation reaction stage.

If it is desired to separate the aldehyde substantially in the monomeric stage from other reaction products, the exit gases of the first reactor, comprising the aldehyde, HCl, and unreacted hydrogen, may be passed down a condenser cooled to minus 78° C. by a mixture of acetone and Dry-Ice. The aldehyde is liquefied and retained in a suitable flask associated with the condenser while hydrogen and some HCl pass through the condensing system as non-liquefied gases. The liquefied aldehyde, still containing some dissolved HCl, may be continuously fed as liquid to a stripping column supplied with a cooled condensing head. In this column, HCl may be disengaged through the head and purified aldehyde continuously removed as liquid from the boiler section at the base of the stripping column. If the aldehyde is to be converted to the ethanol in accordance with this invention, the liquid aldehyde thus isolated and purified then may be fed to a steam heated vaporizer where it is converted to aldehyde gas which then may be fed into the stage 2 reactor. Any polymer incidentally formed will be vaporized and depolymerized in either the vaporizer or stage 2 reactor.

However, when utilizing the preferred two-stage procedure, products exiting the hydrogenation zone consist of the sought-for product $CF_3CH_2OH$, any unreacted $CR_3COCl$ and $CF_3CHO$, the hydrogen chloride formed in the dechlorination step, and possibly some unreacted hydrogen. The organic portion of the hydrogenation reactor exit may be isolated by suitable cooling such as in a Dry-Ice acetone trap. Uncondensed gases leaving the trap may be passed into water where HCl is absorbed. Liquid collected in the cold trap may be refluxed under a head cooled with Dry-Ice thus expelling whatever HCl may be dissolved in the cold trap liquor. After stripping out of absorbed HCl, the cold trap liquor may be fractionally distilled to first separate out unreacted $CF_3COCl$ and $CF_3CHO$. Because of their relatively close boiling points, these materials may be recycled without separation to the inlet of the dechlorination stage. By continued fractional distillation, the sought-for $CF_3CH_2OH$ product may be recovered in substantially pure condition.

Following are examples of practice of the invention, parts being parts by weight unless otherwise indicated.

Example 1

For preparation of a palladium catalyst, 8–14 mesh Columbia 6G activated carbon was mixed with an aqueous palladium chloride solution in quantity such that about 3 parts, calculated as elemental palladium, were present for each 100 parts of carbon. Hence, about 5 g. of $PdCl_2 \cdot 2H_2O$, (100 g. of 5 w./w. percent palladium chloride solution), were added to 100 g. of carbon. The requisite quantity of 5 w./w. percent $PdCl_2$ solution was diluted to about 150 ml. with water before adding the carbon. After standing for about half an hour with occasional shaking, the impregnated carbon was decanted and oven-dried at about 120° C. About 45 ml. of the dried material were charged into a first half-inch I.D. tubular nickel reactor heated externally over about 27 inches of length by an electric furnace provided with automatic temperature control. The material was disposed in a central 14 inch long length of the reactor. Reactor temperature, as measured by an internally disposed thermocouple, was raised to about 300° C. and maintained at this temperature for about 3 hours while passing hydrogen at the rate of about 12 liters/hour. This procedure completed the drying of the catalyst and reduced the $PdCl_2$ to metallic Pd.

A copper metal-chromium oxide catalyst supported on calcium fluoride was prepared as follows: 167 parts of $Ca(NO_3)_2 \cdot 4H_2O$, 118 parts of $Cu(NO_3)_2 \cdot 3H_2O$ and 75 parts of $Cr(NO_3)_3 \cdot 9H_2O$ were dissolved in about 1400 parts of water. To this solution was added a solution of 165 parts of KF and 110 parts of KOH in about 800 parts of water. The resultant mixture was boiled, filtered, washed and substantially dried. About 45 mol of the dried material were charged into a second half-inch I.D. tubular nickel reactor externally heated over 27 inches of length by an electric furnace provided with automatic temperature control. The material was disposed in a central 14 inch long length of the reactor. The material was thoroughly dried by heating at temperature up to 300° C. in a current of nitrogen, then reduced by continued heating for about 3 hours, first at about 150° C. with a stream of hydrogen diluted with nitrogen, followed by heating at about 350° C. in a stream of hydrogen. The finished catalyst contained about four parts calcium fluoride, about two parts copper metal, and about one part chromium oxide. The material was crushed to mesh size of about 6–14.

The exit of the first reactor was connected directly to the inlet of the second reactor. Reaction zone temperature in the first reactor was lowered to about 200° C., and reaction zone temperature in the second reactor was lowered to about 250° C. During a period of about 5 hours, a vaporous mixture of $CF_3COCl$ (B.P. minus 18.5° C.) and hydrogen, consisting of about 1.5 mols (198 g.) of $CF_3COCl$ and 4.5 mols (1000 liters) of hydrogen was passed at about constant rate into and thru the two-reactor system. Throughout the run, in the first reactor, reaction zone temperature was maintained at about 200° C., and in the second reactor, reaction zone temperature was maintained at about 250° C. S.V.H. in each reactor was about 600. Exit products of the first reactor were passed directly into the second reactor. Exit products of the second reactor were passed into and thru a trap cooled by an acetone/Dry-Ice mixture, and non-condensed gases leaving the trap were passed into water where HCl was absorbed. Liquid collected in the cold trap was refluxed under a head cooled with Dry-Ice, and some HCl which was dissolved in the cold trap liquor was expelled and absorbed in water. Titration of the combined aqueous hydrochloric acid solutions showed 0.704 mol of $Cl_2$ as HCl. Since 0.75 mol of $Cl_2$ were introduced as $CF_3COCl$ starting material, dechlorination effected in the first reactor was at least 94% complete. Fractional distillation of the cold trap liquid product (after stripping out of dissolved HCl) effected recovery of 0.306 mol (30 g.) of $CF_3CHO$, (B.P. minus 20° C.), and 1.12 mols (112 g.) of trifluoroethanol, $CF_3CH_2OH$, a colorless liquid having a boiling point of 74.5° C. Thus, of the organic material fed, 20.4 mol percent was recovered as the alcohol, i.e. 94.9 mol percent of the organic starting material was converted and recovered.

Example 2

In this run, apparatus employed was the same as in Example 1; the palladium-on-activated carbon catalyst used in the first reactor contained about 3% by weight of Pd and was made substantially as described in Example 1; and the metallic copper-chromium oxide catalyst employed in the second reactor has substantially the same composition and was made in substantially the same manner as in Example 1. Reaction temperatures and contact time in both reactors were substantially the same as in Example 1. During a period of about 5 hours, a vaporous mixture consisting of about 1.56 mols (206 g.) of $CF_3COCl$ and 4.5 mols (1000 liters) of hydrogen was passed at about constant rate thru the two-reactor system. Exit products of the first reactor were passed directly into the second reactor. Exit products of the second reactor were passed into and thru a trap cooled by an acetone/Dry-Ice mixture, and non-condensed gases leaving the trap were passed into water where the HCl was absorbed. Liquid collected in the cold trap was refluxed under a head cooled with Dry-Ice, and some HCl which had dissolved in the cold trap was expelled and absorbed in water. Titration of the combined aqueous hydrochloric acid solutions showed 1.52 mols of HCl equivalent to 0.76 mol of $Cl_2$. Since 0.78 mol of $Cl_2$ were introduced as $CF_3COCl$ starting material, dechlorination effected in the first reactor was at least 97% complete. Fractional distillation of the cold trap liquid product (after stripping out of dissolved HCl) effected recovery of 0.53 mol (52 g.) of $CF_3CHO$ and 0.96 mol (96 g.) of trifluoroethanol. Of the organic material fed, 35 mol percent was recovered as the aldehyde, and 61 mol percent was recovered as the alcohol. 95.4% of the organic starting material was converted and recovered.

We claim:
1. The process for making $CF_3CH_2OH$ which comprises subjecting $CF_3CHO$ in a reaction zone at substantially atmospheric pressure to the action of hydrogen while maintaining temperature substantially in the range of 200–300° C. and while in the presence of a metallic copper-$Cr_2O_3$ catalyst, and recovering $CF_3CH_2OH$ from the resulting reaction product.
2. The process of claim 1 in which temperature is maintained substantially in the range of 240–275° C.
3. The process of claim 1 in which the weight ratio of metallic copper to oxide of chromium in the said catalyst is substantially in the range of 1:1 to 5:1.

References Cited in the file of this patent

UNITED STATES PATENTS

| | | |
|---|---|---|
| 2,666,797 | Husted et al. | Jan. 19, 1954 |

FOREIGN PATENTS

| | | |
|---|---|---|
| 316,399 | Great Britain | Aug. 1, 1929 |
| 621,654 | Great Britain | Apr. 13, 1949 |
| 781,405 | Great Britain | Aug. 21, 1957 |

OTHER REFERENCES

Grundmann: "Newer Methods of Preparative Organic Chemistry," Interscience, N.Y., 1948, pages 107–8, 112–16.

Vogel: "Practical Organic Chemistry," Longmans, N.Y., 1948, pages 808–9.

Husted et al.: "J.A.C.S.," vol. 74, pages 5422–6 (1952).

La Zerte et al.: "J. Am. Chem. Soc., vol 77, pages 910–914, (1955).